United States Patent
Jones et al.

(10) Patent No.: US 9,858,017 B1
(45) Date of Patent: Jan. 2, 2018

(54) ENHANCED GUI TOOLS FOR ENTRY OF PRINTING SYSTEM DATA

(71) Applicants: Lance Jones, Lafayette, CO (US); Maryamossadat Nematollahi Mahani, Boulder, CO (US); Calin Muresan, Mosnita Noua (RO)

(72) Inventors: Lance Jones, Lafayette, CO (US); Maryamossadat Nematollahi Mahani, Boulder, CO (US); Calin Muresan, Mosnita Noua (RO)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/418,998

(22) Filed: Jan. 30, 2017

(51) Int. Cl.
| | |
|---|---|
| *G06F 15/00* | (2006.01) |
| *G06F 3/12* | (2006.01) |
| *G06K 1/00* | (2006.01) |
| G06F 3/0484 | (2013.01) |
| G06F 3/0482 | (2013.01) |

(52) U.S. Cl.
CPC .......... *G06F 3/1204* (2013.01); *G06F 3/1205* (2013.01); *G06F 3/1253* (2013.01); *G06F 3/0482* (2013.01); *G06F 3/04847* (2013.01)

(58) Field of Classification Search
CPC .... G06F 3/1204; G06F 3/1205; G06F 3/1253; G06F 3/04847; G06F 3/0482
USPC ....................................... 358/1.1, 1.15, 1.13
See application file for complete search history.

(56) References Cited

U.S. PATENT DOCUMENTS

| | | | |
|---|---|---|---|
| 6,839,665 B1 * | 1/2005 | Meyers | G06F 17/27 704/9 |
| 9,128,986 B2 | 9/2015 | Dhake et al. | |
| 2008/0094371 A1 * | 4/2008 | Forstall | G06F 3/04883 345/173 |
| 2013/0227479 A1 | 8/2013 | Ramsey et al. | |
| 2013/0308922 A1 * | 11/2013 | Sano | H04N 21/4316 386/245 |
| 2015/0051929 A1 | 2/2015 | Ranz | |

OTHER PUBLICATIONS

Air Forms—Your Business on the iPad—Polar Bear Farm; http://polarbearfarm.com/airforms/documentation/lists/index.php; Oct. 17, 2016.

(Continued)

*Primary Examiner* — Douglas Tran
(74) *Attorney, Agent, or Firm* — Duft Bornsen & Fettig LLP

(57) ABSTRACT

Systems and methods are provided for indicating capabilities of a printer. One embodiment is a system that includes a memory storing instructions for operating a Graphical User Interface (GUI), and a controller that presents the GUI based on the instructions. A control of the GUI includes a list of entries that each correspond with a potential printer capability. Responsive to detecting new text entered into a text field, the GUI displays an add button. In response to detecting a cursor over an entry in the list: the GUI displays a select button for selecting the entry to indicate actual capabilities of a specific printer. In response to detecting that a user has clicked on one of the select buttons to indicate an actual capability of the printer, the GUI selects a corresponding entry for the select button in combination with other entries to indicate the actual capabilities of the printer.

20 Claims, 6 Drawing Sheets

(56) References Cited

OTHER PUBLICATIONS

Edit, delete, or insert records in a Data View; https://support.office.com/en-gb/article/Edit-delete-or-insert-records-in-a-Data-View; Microsoft Oct. 17, 2016.

List.je-Search, sort, filters, flexibility to tables, list and more; https://www.listjs.com/examples/add-get-remove; Oct. 17, 2016.

Perform List, Insert, Update, and Delete in a Single View in ASP.NET MVC; https://www.binaryintellect.net/articles; Oct. 17, 2016.

UI Pattern Ideas: List with Functions CSS-Tricks: https://css-tricks.com/ui-pattern-ideas-list-with-functions/; Oct. 17, 2016.

"The complete guide to Gmail, Lesson 7: Use Gmail as a Task List," How-To Geek School, http://www.howtogeek.com/school/gmail-guide/lesson7/, Jan. 18, 2017.

* cited by examiner

ENHANCED GUI TOOLS FOR ENTRY OF PRINTING SYSTEM DATA

FIELD OF THE INVENTION

The invention relates to the field of printing, and in particular, to indicating a configuration of a printer.

BACKGROUND

Printers include a varying and wide range of capabilities. For example, supported Page Description Languages (PDLs) and loadouts of print media may substantially vary on a printer by printer basis. These capabilities may further vary depending on how the printer is configured by a print shop operator. For example, a print shop may use two printers of the same model, yet load those printers with different combinations of media.

Because printer configurations may vary substantially, it remains important for software managing a print shop to be kept up to date with information describing the configurations of various printers. It is not uncommon for this data to be entered manually by a print shop operator. However, current methods of entering data to update information about printer configurations are archaic, occupy a great deal of screen space, and are awkward to use. Hence, print shop operators continue to seek out enhanced systems that enable them to enter data describing printer configurations in a manner that is both efficient and convenient.

SUMMARY

Embodiments described herein provide for enhanced Graphical User Interfaces (GUIs) which include a single control having dynamically viewable elements for updating a list of entries describing the capabilities of a printer. For example, the control may dynamically display buttons for interacting with entries in the list, based on whether a user hovers a cursor over those entries. Based on a user's selection of multiple entries from the list, the capabilities of the printer are indicated to a printing system.

One embodiment is a system that includes a memory storing instructions for operating a Graphical User Interface (GUI), and a controller that presents the GUI at a display based on the instructions. A control of the GUI includes a list of entries that each correspond with a potential printer capability, and the control further includes a text field bordering the list. Responsive to detecting new text entered into the text field, the GUI displays an add button overlapping the text field for adding a new entry to the list. In response to detecting that a user has clicked on the add button, if the new text does not duplicate any existing entry in the list, the GUI generates a new entry in the list having a name that matches the new text, and highlights the new entry for a period of time. Otherwise, if the new text does duplicate an existing entry in the list, the GUI prevents generation of a new entry, and instead presents a warning bordering the text field for a period of time. In response to detecting a cursor over an entry in the list: the GUI displays a select button at the entry for selecting the entry to indicate actual capabilities of a specific printer, and in response to determining that the entry is editable, the GUI displays a delete button at the entry that deletes the entry from the list. Otherwise, in response to determining that the entry is non-editable, the GUI prevents display of the delete button. In response to detecting that a user has clicked on one of the select buttons to indicate an actual capability of the printer, the GUI highlights the select button, and selects a corresponding entry for the select button in combination with other entries to indicate the actual capabilities of the printer.

A further embodiment is a method. The method includes presenting a Graphical User Interface (GUI) at a display based on instructions stored in a memory, wherein a control of the GUI includes a list of entries that each correspond with a potential printer capability, and the control further includes a text field bordering the list. Responsive to detecting new text entered into the text field, the GUI displays an add button overlapping the text field for adding a new entry to the list. In response to detecting that a user has clicked on the add button, if the new text does not duplicate any existing entry in the list, the method includes generating a new entry in the list having a name that matches the new text, and highlighting the new entry in a first color for a period of time. Otherwise, if the new text does duplicate an existing entry in the list, the method includes preventing generation of a new entry, and instead presenting a warning, in a second color, bordering the text field. In response to detecting a cursor over an entry in the list, the method includes displaying a select button for selecting the entry, and in response to determining that the entry is editable, displaying a delete button that deletes the entry from the list. Otherwise, in response to determining that the entry is non-editable, the method includes preventing display of the delete button. In response to detecting that a user has clicked on one of the select buttons to indicate an actual capability of a printer, the method includes highlighting the select button, and selecting a corresponding entry for the select button in combination with other entries to indicate the actual capabilities of the printer.

A further embodiment is a non-transitory computer readable medium embodying programmed instructions which, when executed by a processor, are operable for performing a method. The method includes presenting a Graphical User Interface (GUI) at a display based on instructions stored in a memory, wherein a control of the GUI includes a list of entries that each correspond with a potential printer capability, and the control further includes a text field bordering the list. Responsive to detecting new text entered into the text field, the GUI displays an add button overlapping the text field for adding a new entry to the list. In response to detecting that a user has clicked on the add button, if the new text does not duplicate any existing entry in the list, the method includes generating a new entry in the list having a name that matches the new text, and highlighting the new entry in a first color for a period of time. Otherwise, if the new text does duplicate an existing entry in the list, the method includes preventing generation of a new entry, and instead presenting a warning, in a second color, bordering the text field. In response to detecting a cursor over an entry in the list, the method includes displaying a select button for selecting the entry, and in response to determining that the entry is editable, displaying a delete button that deletes the entry from the list. Otherwise, in response to determining that the entry is non-editable, the method includes preventing display of the delete button. In response to detecting that a user has clicked on one of the select buttons to indicate an actual capability of a printer, the method includes highlighting the select button, and selecting a corresponding entry for the select button in combination with other entries to indicate the actual capabilities of the printer.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
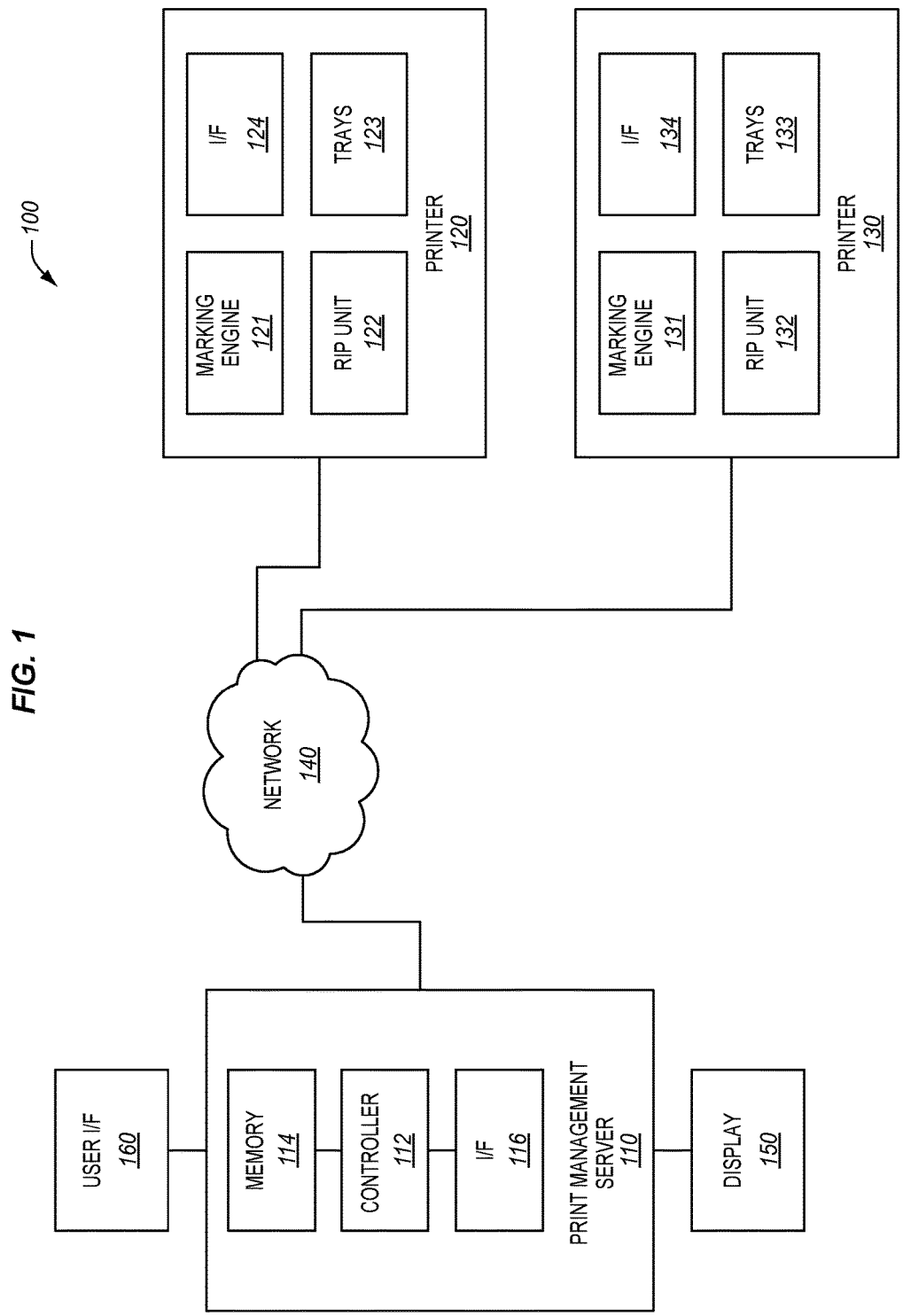
FIG. 1 is a block diagram of a printing system in an exemplary embodiment.

FIG. 1 is a block diagram of a printing system 100 in an exemplary embodiment. Printing system 100 comprises any systems, devices, or components operable to print incoming print jobs received from users. In this embodiment, printing system 100 comprises print management server 110, which communicates with printers 120 and 130 via network 140. Print management server 110 utilizes display 150 to present one or more GUIs to users, and utilizes user interface (I/F) 160 in order to receive user input pertaining to presented GUIs. Printing system 100 has been enhanced with GUIs that enable faster and more efficient entry of information describing the capabilities and/or configurations of printers 120 and 130. Specifically, GUIs presented via print management server 110 include dynamic controls that exhibit a variety of features for enhancing the speed and ease of data entry when populating lists of potential capabilities, and also when selecting entries from such lists to indicate the actual capabilities of a specific printer. As used herein, a "potential capability" is a capability that one or more printers could have, while an "actual capability" is a specific capability that a specific printer has.

Print management server 110 manages user interactions with printers 120 and 130 in order to facilitate the handling of print jobs. In this embodiment, print management server 110 includes controller 112, memory 114, and I/F 116. Controller 112 manages the operations of print management server 110, by executing instructions stored in memory 114. Memory 114 stores one or more lists that describe potential capabilities for printers within printing system 100. Memory 114 further includes information indicating the actual capabilities of each printer, based on these lists. For example, memory 114 may store information comprising a selection of entries from a list, in order to indicate what capabilities in the list are supported by printer 120. In one embodiment, if a printer is loaded with multiple types of print media, then multiple entries from a list for the print media category may be selected to indicate that printer's media capabilities. Similarly, if a printer is capable of processing multiple different types of PDL, then multiple entries from a language category list may be selected to indicate the printer's supported PDLs. I/F 116 is utilized by print management server 110 to communicate with printers 120 and/or 130 on a regular basis (e.g., via network 140).

Memory 114 further stores instructions for one or more GUIs to users of print management server 110. At least one of the GUIs includes an enhanced control for updating a list of potential capabilities for a printer, and also selecting entries from the list in order to indicate the actual capabilities of a specific printer.

Controller 112 may be implemented as custom circuitry, as a hardware processor executing programmed instructions, etc. Memory 114 may be implemented as a solid state memory, spinning disk, etc. in order to electronically store capability information for printers 120 and 130. I/F 116 may comprise an Ethernet interface, Wi-Fi interface, etc. for engaging in communications with network 140. Display 150 comprises any suitable screen or device capable of visually presenting GUIs to users of print management system 110, based on input from controller 112. User I/F 160 may comprise a keyboard, mouse, etc. for interacting with controls presented on such GUIs. In one embodiment, display 150 and user I/F 160 are integrated in the form of a touch screen which the user may directly interact with.

Network 140 carries communications between print management server 110 and printers 120 and 130, based on user interactions with GUIs presented via display 150. Network 140 comprises any combination of devices and components for routing communications between print management server 140 and printers 120 and 130. For example, network 140 may comprise the Internet, a local intranet, etc.

Printers 120 and 130 physically mark print media based on received print jobs from print management server 110. While only two printers are illustrated, in further embodiments any suitable number of printers may be managed by print management server 110. In this embodiment, printer 120 includes I/F 124 for exchanging data via network 140. In response to receiving print data from network 140, printer 120 may engage in rasterization of the print data via Rasterization Image Processing (RIP) unit 122, which may include multiple Rasterization Image Processors. The rasterized print data may then be used to direct the operations of marking engine 121 (e.g., an inkjet marking engine, laser print engine, etc.) in order to mark physical media. Trays 123 store media at printer 120. Printer 130 includes similar elements to those of printer 120, such as marking engine 131, RIP unit 132, trays 133, and I/F 134.

The particular arrangement, number, and configuration of components described herein is exemplary and non-limiting. Illustrative details of the operation of printing system 100 will be discussed with regard to FIG. 2. Assume, for this embodiment, that a user wishes to update a list of potential capabilities at print management 110, and wishes to select entries from the updated list to indicate the actual capabilities of printer 120.

Figure 2:
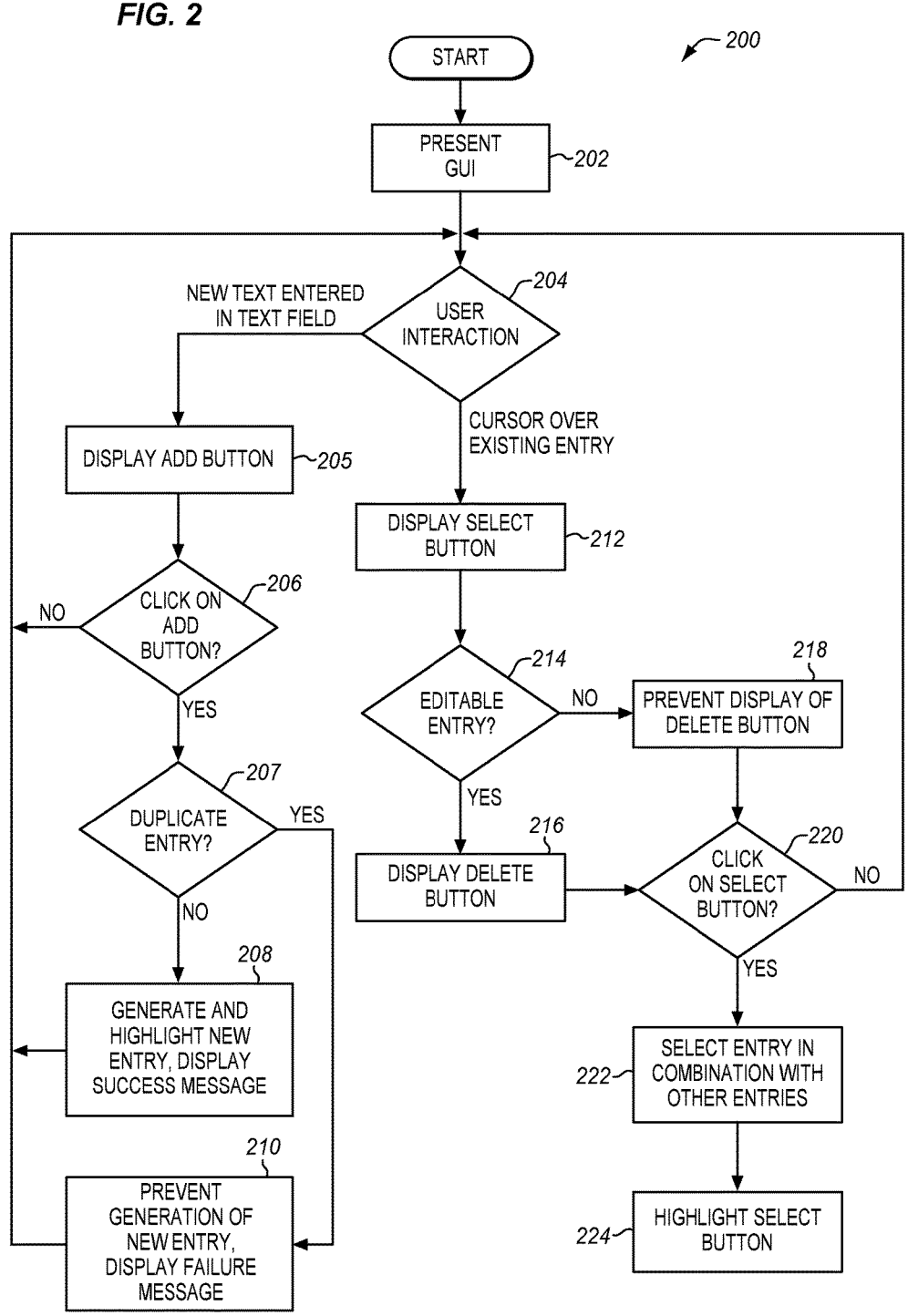
FIG. 2 is a flowchart illustrating a method for operating a printing system in an exemplary embodiment.

FIG. 2 is a flowchart illustrating a method 200 for operating a printing system in an exemplary embodiment. The steps of method 200 are described with reference to printing system 100 of FIG. 1, but those skilled in the art will appreciate that method 200 may be performed in other systems. The steps of the flowcharts described herein are not all inclusive and may include other steps not shown. The steps described herein may also be performed in an alternative order.

Method 200 may initiate, for example, in response to a user selecting a printer and a category of capabilities (e.g., media, language, etc.) to indicate for that printer. Assume, for this embodiment, that the user has selected the category of "media" for printer 120, in order to indicate the actual media capabilities of printer 120. Thus, controller 112 accesses a list corresponding with the media category in memory 114, and generates a GUI for editing the list and selecting multiple entries from the list. In this manner, the user may operate the GUI in order to not only to select the actual capabilities of printer 120 with respect to print media loadout, but also to add or remove entries from the list of potential capabilities. This eliminates the need for the user to switch between different dialogues of the GUI in order to perform these related functions.

In step 202, controller 112 presents a GUI to a user (e.g., a print shop operator) via display 150. The GUI may be presented as a dialogue that includes one or more controls. As used herein, a "control" at a GUI refers to one or more interactive elements that are together defined by one coded function, and that provide neighboring (e.g., touching/bordering) on-screen locations for receiving user input and displaying responses to that user input. Examples of controls include a drop down menu function, a listbox function, etc. Controller 112 presents the GUI at display 150 based on instructions stored in a memory 114 (step 202). The GUI includes a control comprising an editable list having at least one entry, and further comprising a text field bordering the list. The list corresponds with a category of potential capabilities of a printer (e.g., media, language, etc.), and each entry in the list is selectable to indicate an actual capability for a printer. Both the editable list and bordering text field are components of the same control and hence are defined by the same function.

At some point in time, a user utilizes user I/F 160 to interact with the GUI (step 204). If the user interaction is entering new text into the text field (e.g., in order to type a name for a new entry), controller 112 displays an add button at the text field (e.g., overlapping the text field) which enables the user to attempt to create a new entry with a name matching the new text (step 205). If the user clicks on the add button (step 206), controller 112 determines whether or not the new text duplicates an existing entry already in the list (step 207). If the new text does not duplicate any existing entry in the list, then controller 112 generates a new entry in the list in memory 114 (step 208). The new entry has a name that matches the new text. Controller 112 further operates the GUI to highlight the new entry in a first color (e.g., green) for a period of time (e.g., three seconds), and may provide a message confirming successful creation of the new entry. Alternatively, if the new text does duplicate an existing entry in the list, then controller 112 prevents generation of a new entry in the list, instead presenting a warning, in a second color (e.g., red), bordering the text field (step 210). The warning may be accompanied by a message indicating a failure in attempting to create a new entry.

If the user interaction does not comprise entering new text into the text field, but rather comprises a cursor being placed over an existing entry, then controller 112 operates the GUI to display a select button for selecting the entry in combination with other entries (step 212). The select button may comprise a checkbox or similar graphical feature that allows the entry to be selected in combination with other entries in the list (i.e., the selection of the entry does not de-select other entries in the list). Controller 112 further consults memory 114 to determine whether the entry is an editable entry or not (step 214). An editable entry may comprise a user-generated addition to the list, while a non-editable entry may comprise an entry that is included by default within the list. In a further embodiment, editable and non-editable entries may be distinguished based on user permissions, such that all entries are editable to an administrator account, while only some entries or no entries are editable by users having fewer permissions.

If the entry is an editable entry, then hovering the cursor over the entry causes a delete button to be displayed at the entry (step 216). Alternatively, if the entry is non-editable, then controller 112 prevents display of the delete button (step 218). The delete button may be clicked upon by the user to delete the entry from the list. Regardless of whether a delete button is presented, processing continues to step 220, where controller 112 determines whether or not the cursor clicks on the select button. If the user does click on the select button, then the entry is selected in combination with other entries in the list (step 222). That is, the entry is added to the set of entries that have already been selected for the list, instead of replacing the entries that have already been selected. Controller 112 further updates the GUI to highlight the select button, for example in a third color (e.g., blue), and updates memory 114 to indicate that the current printer has the selected capability (e.g., as one of many capabilities in the category). Alternatively, if the user does not click on the select button but rather moves the cursor away from the entry, then processing continues to step 204 as controller 112 awaits further user input.

Using the GUI described in method 200, a user may dynamically select the actual capabilities of a printer from a list of potential printer capabilities, and may also update the list to add new entries if the list does not include capabilities which the printer has. This ensures that the printer's capabilities can be accurately updated and tracked, allowing for more efficient handling of print jobs within printing system 100.

Examples

In the following examples, additional processes, systems, and methods are described in the context of an ADF system that prints and sorts bills for mass-mailing to customers.

Figure 3:
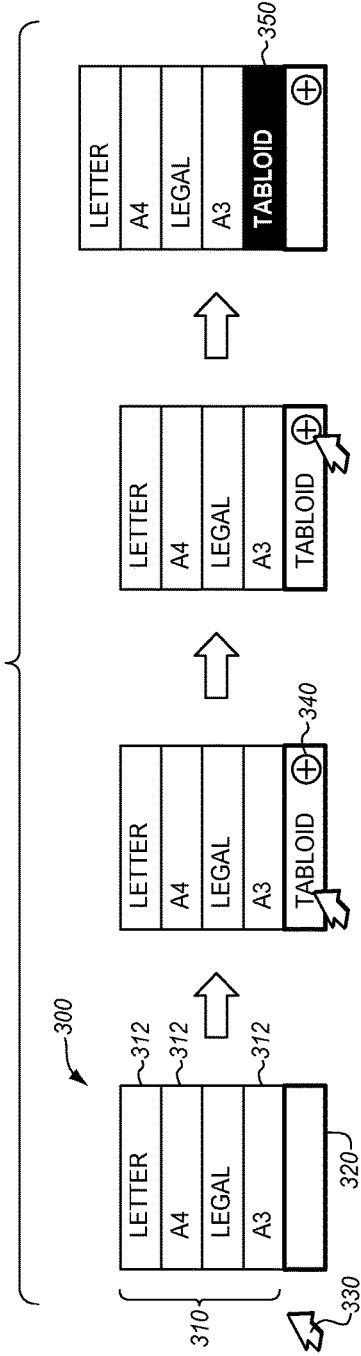
FIGS. 3-5 are diagrams illustrating user interactions with a GUI generated by a printing system in an exemplary embodiment.
Figure 4:
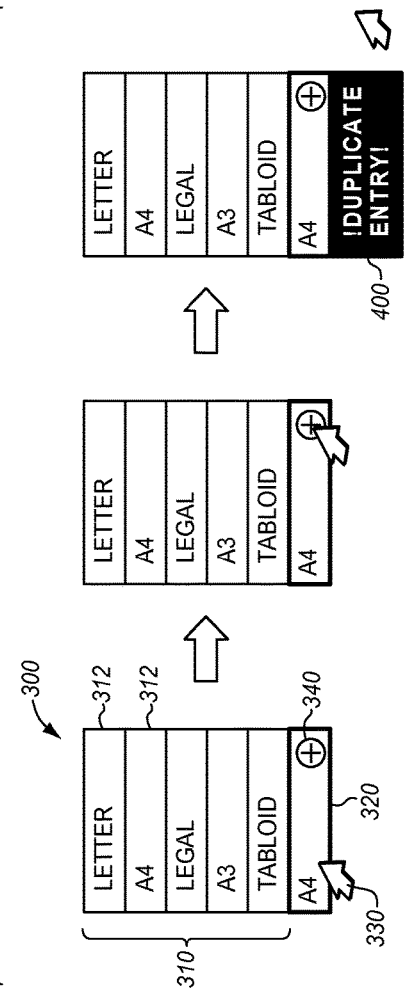
Figure 5:
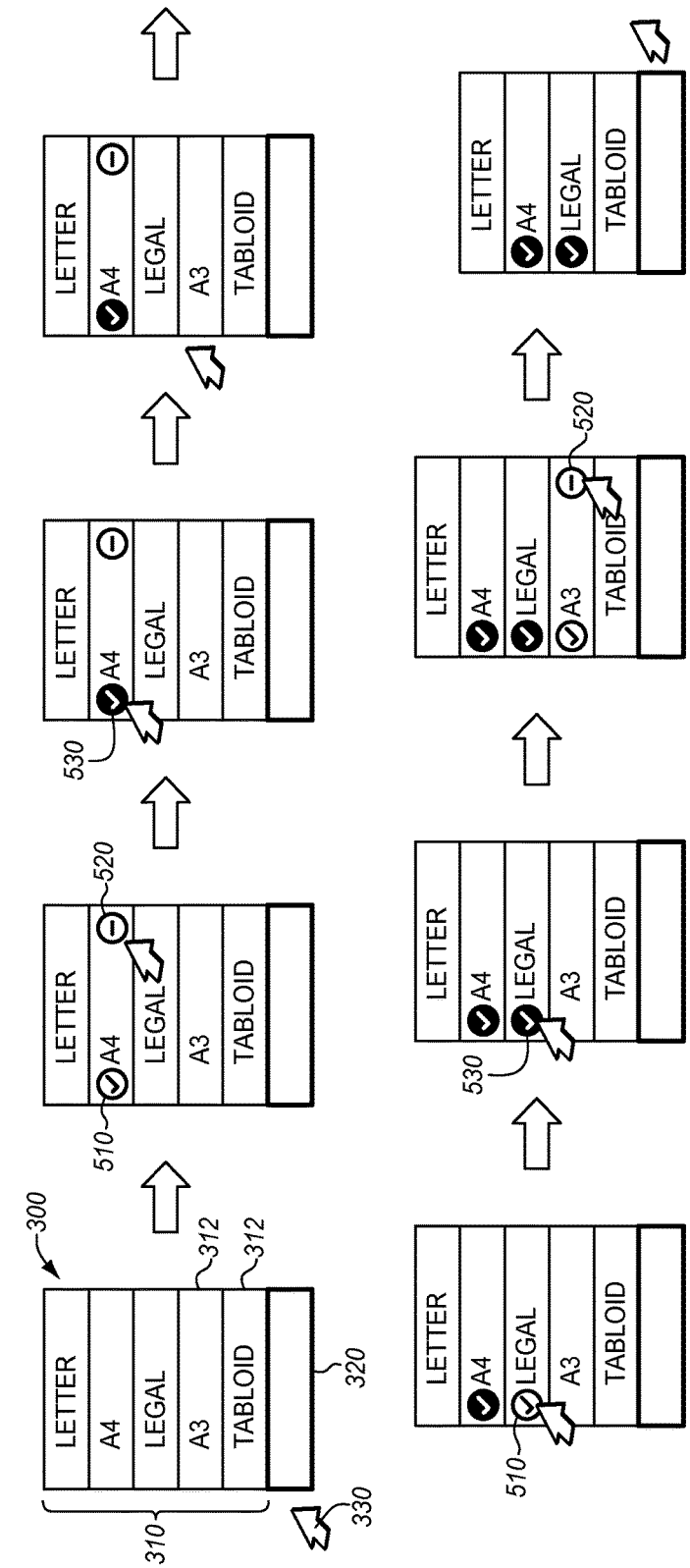

FIGS. 3-5 are diagrams illustrating user interactions with a control of a GUI generated by a printing system in an exemplary embodiment. Specifically, FIG. 3 illustrates addition of a new entry to a list, via the control FIG. 4 illustrates rejection of a duplicate entry, and FIG. 5 illustrates a multi-select process at the control. Each of these FIGS. illustrates modifications to a list of potential capabilities of a printer with respect to media loadout. In further examples, the list may relate to different categories of capabilities (such as supported PDL languages or data formats for print jobs), etc. Furthermore, the selection process shown in FIG. 5 illustrates the selection of actual capabilities for a single printer, and may be performed multiple times (e.g., once per printer at printing system 100) in order to indicate the varying capabilities of different printers in a printing system. Hence, the selected entries from the list may vary depending on the printer.

FIG. 3 illustrates the use of a control 300 to add a new entry to a list. As shown in FIG. 3, control 300 presents a list 310 (including entries 312), as well as text field 320. A user's cursor 330 is also presented. The interactions between cursor 330 and control 300 are illustrated over time from left to right as indicated by the arrows in FIG. 3. When cursor 330 clicks on text field 320, controller 112 enables the user to enter new text into text field 320, and further presents add button 340 at text field 320, for adding the new text as a new entry in list 310. In this case, the user types in "TABLOID" indicating a tabloid media type. The user then clicks on add button 340, resulting in a new entry 350 ("TABLOID") being added to list 310. In this embodiment, upon creation of new entry 350, new entry 350 is highlighted in green for several seconds.

FIG. 4 illustrates a similar scenario to that of FIG. 3, except that the new text entered in text field 320 is a duplicate of an existing entry. That is, the new text entered into text field 320 matches, letter for letter on a case-insensitive basis, an existing entry for A4 media. Hence, when add button 340 is clicked, controller 112 prevents creation of a new entry, and instead displays a warning bordering (i.e., touching) text field 320. The warning indicates that a new entry has not been created as this would result in a duplicate. The warning, in this embodiment, is presented in red for a period of one to three seconds after the user clicks on add button 340.

FIG. 5 illustrates actions for selecting multiple items via list 310, in order to indicate the actual capabilities of a printer. As shown in FIG. 5, as cursor 330 is placed over an entry for A4 media. When cursor 330 is placed over the entry for A4, controller 112 presents select button 510 at the entry. Controller 112 further determines, based on information in memory 114, that the entry is editable, and delete button 520 for deleting the entry is therefore displayed. When cursor 330 clicks on select button 510, select button 510 is highlighted, changing color from white to blue as indicated at element 530. Controller 112 also updates memory 114 to indicate that the current printer is capable of printing A4 media (e.g., is presently loaded with A4 media). Cursor 330 then proceeds to move over the LEGAL entry in list 310. Controller 112 presents a select button 510 at the LEGAL entry for selecting the LEGAL entry. However, controller 112 determines, based on information in memory 112, that the LEGAL entry is a default entry and hence is not removable. Because of this, controller 112 prevents the display of delete button 520. Cursor 330 clicks on select button 510 at the LEGAL entry, therefore selecting the LEGAL entry in combination with the A4 entry. Controller 112 then proceeds to update information in memory 114 to indicate that the current printer is also capable of printing legal-sized media. Cursor 330 moves onward to hover over the A3 entry, which is editable, and cursor 330 clicks on delete button 520 to delete the A3 entry. Controller 112 therefore proceeds to delete the A3 entry from the list stored in memory 114, and updates the GUI to remove the A3 entry from view. Thus, the next time the list is loaded (e.g., in order to select the media capabilities of a different printer), the A3 entry will not exist in the list and hence will not be presented as a potential capability for selection.

Figure 6:
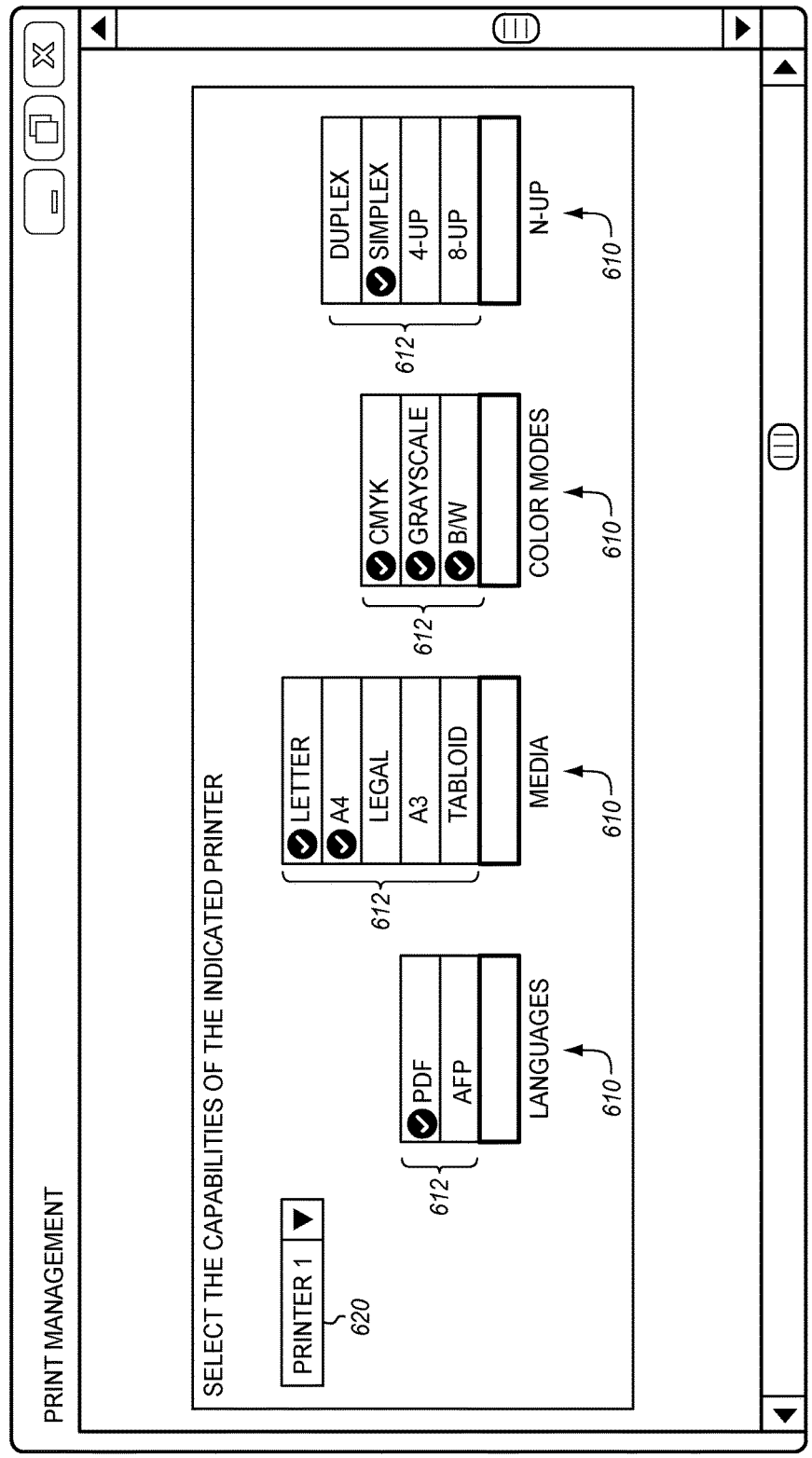
FIG. 6 is a diagram illustrating a GUI comprising multiple controls for managing multi-select lists in an exemplary embodiment.

FIG. 6 is a diagram illustrating a GUI comprising multiple controls 610 for managing multi-select lists 612 in an exemplary embodiment. Each list 612 corresponds to a different category of printer capabilities, and checked entries from each list indicate an actual capability of a printer selected via drop-down menu 620. In this embodiment, the categories include supported languages (i.e., PDLs) that the printer is capable of rasterizing, media loaded at the printer, color modes supported by the printer, and N-up modes supported by the printer.

In one embodiment, the following code may be utilized to present the dynamic controls described herein for updating a list that supports the selection of multiple entries at once.

```
/*jshint sub:true*/
CORE.define('props-custom-table', function (sandbox) {
        var customTableData = {}, type = '';
        function addCustomTableGrid(data) {
            var sgColumns = [],
                sgContent = [],
                i;
            var tableColumns = data.itemProperties.header;
            var numberOfColumns = 0;
            if (data.itemProperties.columns !== undefined)
                numberOfColumns =
                data.itemProperties.columns;
            else numberOfColumns = tableColumns.length;
            var custom Data = {};
            var identifierData = {};
            for (i = 0; i < numberOfColumns; i++) {
                var column = tableColumns[i];
                sgColumns.push({
                    name: column.display,
                    field: column.id,
                    id: column.id,
                    sortable: false,
                    cssClass: 'ipm-grid-component-column'
                });
            }
            customData['addTitle'] =
            data.itemProperties.adddlgtitle;
            customData['editTitle'] =
            data.itemProperties.editdlgtitle;
            customData['header'] = tableColumns;
            customData['numberOfAttributes'] =
            numberOfColumns;
            identifierData[data.itemProperties.name] =
            customData;
            sandbox.emit({type: 'store-custom-table-row-
                identifiers', data:
identifierData});
            var tableRows = [];
            var valuesLength = data.itemProperties.values.
            length;
            for (i = 0; i < valuesLength; i++) {
                var object = data.itemProperties.values[i];
                var obj = {};
                var initialObject = {};
                for (var itemPos in object) {
                    if (object.hasOwnProperty(itemPos)) {
                        obj[tableColumns[itemPos].id] =
object[itemPos].display;
                        initialObject[itemPos] = {};
                        initialObject[itemPos].value =
object[itemPos].display;
                        initialObject[itemPos].id =
object[itemPos].id;
                        initialObject[itemPos].type =
tableColumns[itemPos].type;
                    }
                }
                sgContent.push(obj);
            tableRows.push(initialObject);
            }
        var tableObjId = data.itemProperties.name;
        customTableData[tableObjId] = {oID: data.itemProperties.id,
        header:
data.itemProperties.header, tableRows: tableRows};
            sandbox.createSlickGridTable({gridID: '#' +
            data.gridID,
                editable: false,
                addRow: false,
                addCellNavigation: true,
                enableColumnReorder: false,
                rowHeight: 30,
                fitColumns: true,
                multiSelect:true,
                enableSorting: false,
                gridContent: sgContent,
```

```
                gridColumns: sgColumns,
                helpFeature: true,
                addButtonBand: true,
                buttonBandActions: ['edit', 'delete'],
                addContextMenu: false,
                enableCustomization: false,
                sortFirstRow: false
            });
            var currentGridContainer = sandbox.select('#' +
data.gridID)[0].parentNode.children;//,
                sandbox.addEvent('#' + currentGridContainer[1].
                    children[2].id,
'click', function (evt) {
                sandbox.emit({
                    type: 'show-add-custom-table-row-dialog',
                    data: {addTableRow: true, gridID:
                        data.gridID,
objType: data.type, source: data.itemProperties.name}
                });
            });
            sandbox.removeEvent(currentGridContainer[1].
                children[1], 'click');
            sandbox.addEvent(currentGridContainer[1].
                children[1], 'click',
function (evt) {
                sandbox.emit({
                    type: 'show-add-custom-table-row-dialog',
                    data: {addTableRow: true, gridID,
                        data.gridID,
objType: data.type, source: data.itemProperties.name}
                });
            });
            sandbox.emit({type: "attach-help-event",
                data: {item ID:
currentGridContainer[1].children[0].id} });
        }
        function saveNewCustomTableRow(data) {
            var internalRow, header, newRow;
            if (data !== undefined) {
                var pos;
                newGridRow = {};
                internal Row = {};
                header = customTableData[data.source]['header'];
                for (pos in data.rowData) {
                    if (typeof(data.rowData[pos]) === 'object') {
                        newGridRow[pos] = data.rowData[pos].display;
                        internalRow[pos] = data.rowData[pos].id;
                    } else {
                        newGridRow[pos] = data.rowData[pos];
                        internalRow[pos] = data.rowData[pos];
                    }
                }
                sandbox.addRowInSlickGridTable({gridID: '#' +
                    data.gridID, newItem:
newGridRow});
                newRow = {};
                var temp;
                for (pos in header) {
                    temp = {};
                    temp.id = internalRow[header[pos].id];
                    temp.type = header[pos].type;
                    temp.value = newGridRow[header[pos].id];
                    newRow[pos] = temp;//.slice( );
                }
                customTableData[data.source]['tableRows'].push(newRow);
                sandbox.emit({type: 'update-custom-table-' + data. source +
                    '-data', data:
{tableType: data.source, id: customTableData[data.source].oID,
props:
customTableData[data.source]['tableRows']}});
            }
        }
        function saveEditedCustomTableRow(data) {
            var header, pos;
            if (data !== undefined) {
                header = customTableData[data.source]['header'];
                var newGridRow = {};
                for (pos in data.rowData) {
                    if (typeof(data.rowData[pos]) === 'object') {
                        newGridRow[pos] = data.rowData[pos].display;
                    } else {
                        newGridRow[pos] = data.rowData[pos];
                    }
                }
                sandbox.editRowInSlickGridTable({gridID: '#' + data.gridID,
rowId: data.rowId, editedValues: newGridRow});
                for (pos in header) {
                    if (typeof(data.rowData[header[pos].id]) === 'object') {
                        customTableData[data.source]['tableRows']
                            [data.rowId][pos].id =
data.rowData[header[pos].id].id;
                        customTableData[data.source]['tableRows']
                            [data.rowId][pos].display =
data.rowData[header[pos].id].display;
                    } else {
                        customTableData[data.source]['tableRows']
                            [data.rowId][pos].id =
data.rowData[header[pos].id];
                        customTableData[data.source]['tableRows']
                            [data.rowId][pos.display =
data.rowData[header[pos].id];
                    }
                }
                sandbox.emit({type: 'update-custom-table-' + data.source +
                    '-data', data:
{tableType: data.source, id: customTableData[data.source].oID,
props:
customTableData[data.source]['tableRows']}});
            }
        }
        /*
        function editCustomTableGridRow( ) {
        }
        function saveNewCustomTableGridRow( ) {
        }
        function saveEditedCustomTableGridRow( ) {
        }
        */
        function deleteCustomTableGridRow(data) {
            var rows, tempBuff, objType, dlgType, source, pos,
                rowsLength = 0;
            if (data !== undefined) {
                tempBuff = data.gridID.split('-', 4);
                //objType = tempBuff[2];
                //dlgType = tempBuff[3];
                source = data.gridID.substring(data.gridID.indexOf
(tempBuff[3]) + tempBuff[3].length + 1, data.gridID.length - 3);
                rows = data.itemsToDelete;
                rowsLength = rows.length;
                for (pos = 0; pos < rowsLength; pos++) {
                    customTableData[source]['tableRowsTsplice(rows
                        [pos], 1);
                }
                sandbox.emit({type: 'update-custom-table-' + source + '-data',
                    data: {tableType:
source, id: customTableData[source].oID, props:
customTableData[source]['tableRows']}});
            }
            return {
                init: function ( ) {
                    sandbox.listen({
                        'add-notify-operator-
grid'                      : addCustomTableGrid,
                        'add-psf-tray-characteristics-
grid'                      : addCustomTableGrid,
                        'add-output-bin-numbers-grid'       : addCustomTableGrid,
                        'add-ascii-font-map-grid'          : addCustomTableGrid,
                        'add-input-trays-medium-grid'       : addCustomTableGrid,
                        'save-new-custom-table-
row'                       : saveNewCustomTableRow,
                        'save-edited-custom-table-row'                  :
saveEditedCustomTableRow,
                        'delete-rows-from-grid-ipm-dialog-ad-props-
                            notify-operator-sg'                        :
```

-continued

```
deleteCustomTableGrid Row,
        'delete-rows-from-grid-ipm-dialog-ad-props-
           psf-tray-characteristics-sg'                :
deleteCustomTableGrid Row,
        'delete-rows-from-grid-ipm-dialog-ad-props-
           output-bin-numbers-sg'                      :
deleteCustomTableGrid Row,
        'delete-rows-from-grid-ipm-dialog-ad-props-
           ascii-font-map-sg'                          :
deleteCustomTableGrid Row,
        'delete-rows-from-grid-ipm-dialog-ad-props-
           input-trays-medium-sg'                      :
deleteCustomTableGrid Row
/*
                  'update-rows-from-grid-ipm-dialog-ad-props-
notif-sg'                    : editCustomTableGridRow,
                  'save-new-notification-profile-ipm-dialog-ad-
props-notif-sg'              : saveNewCustomTableGrid Row,
                  'save-edited-notification-profile-ipm-dialog-ad-
props-notif-sg'              : saveEditedCustomTableGridRow,
                  'delete-rows-from-grid-ipm-dialog-ad-props-
notif-sg'                    : deleteCustomTableGridRow
*/                           });
        },
        destroy: function ( ) {}
    };
});
```

Figure 7:
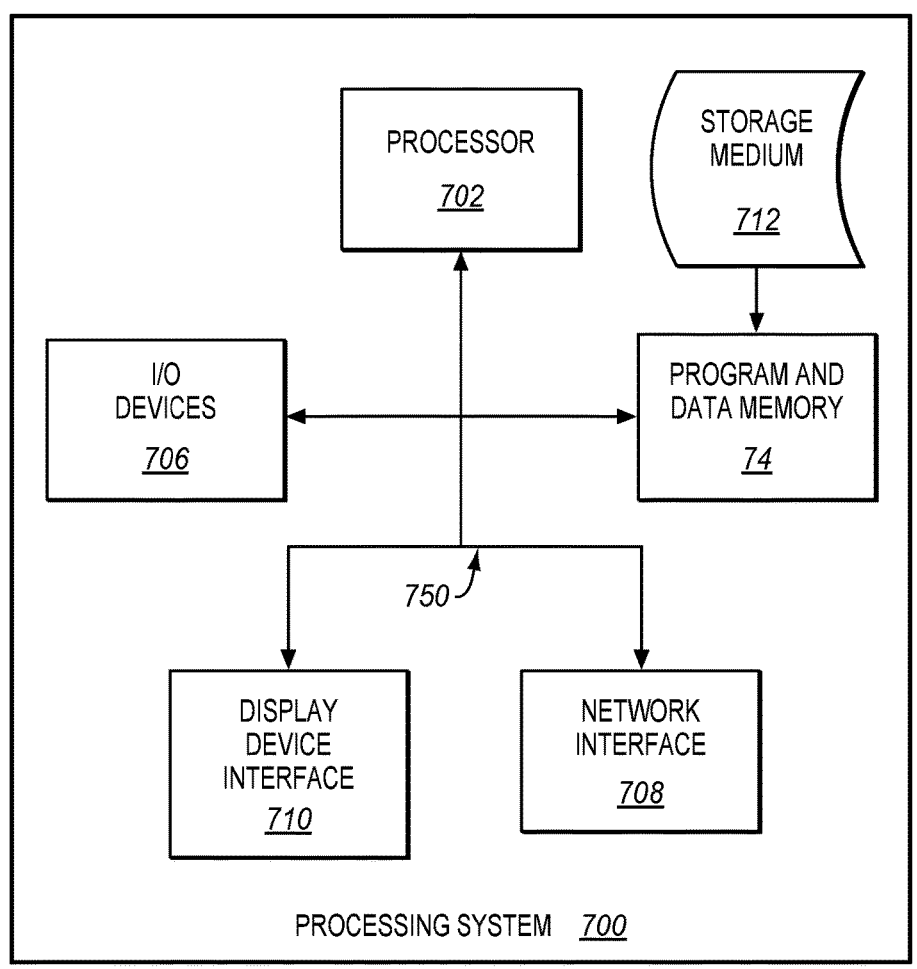
FIG. 7 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of printing system 100 to perform the various operations disclosed herein. FIG. 7 illustrates a processing system 700 operable to execute a computer readable medium embodying programmed instructions to perform desired functions in an exemplary embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 710 may be integrated with the system to interface to one or more display devices, such as printing systems and screens for presentation of data generated by processor 702.

Although specific embodiments were described herein, the scope of the invention is not limited to those specific embodiments. The scope of the invention is defined by the following claims and any equivalents thereof.

We claim:

1. A system comprising:
a memory storing instructions for operating a Graphical User Interface (GUI); and
a controller that presents the GUI at a display based on the instructions;
wherein a control of the GUI includes a list of entries that each correspond with a potential printer capability, and the control further includes a text field bordering the list,
wherein responsive to detecting new text entered into the text field, the GUI displays an add button overlapping the text field for adding a new entry to the list; and
in response to detecting that a user has clicked on the add button:
if the new text does not duplicate any existing entry in the list, the GUI generates a new entry in the list having a name that matches the new text, and highlights the new entry for a period of time; and
if the new text does duplicate an existing entry in the list, the GUI prevents generation of a new entry, and instead presents a warning bordering the text field for a period of time,
wherein in response to detecting a cursor over an entry in the list:
the GUI displays a select button at the entry for selecting the entry to indicate actual capabilities of a specific printer;
in response to determining that the entry is editable, the GUI displays a delete button at the entry that deletes the entry from the list; and
in response to determining that the entry is non-editable, the GUI prevents display of the delete button,
wherein in response to detecting that a user has clicked on one of the select buttons to indicate an actual capability of the printer, the GUI highlights the select button, and selects a corresponding entry for the select button in combination with other entries to indicate the actual capabilities of the printer.

2. The system of claim 1 wherein:
the GUI highlights the select button by changing a color of the select button.

3. The system of claim 1 wherein:
the list is one of multiple lists stored in the memory, and each list corresponds with a different category of capabilities for printers.

4. The system of claim 3 wherein:
the list corresponds with a category for print media, and selected entries from the list indicate types of print media loaded at the printer.

5. The system of claim 1 wherein:
the selected entries from the list vary depending on printer.

6. The system of claim 1 wherein:
the GUI highlights new entries in a first color;
the GUI presents the warning in a second color; and
the GUI highlights select buttons in a third color.

7. The system of claim 1 wherein:
the delete button includes a "−" symbol;
the add button includes a "+" symbol; and
the select button includes a check symbol.

8. A method comprising:
presenting a Graphical User Interface (GUI) at a display based on instructions stored in a memory, wherein a control of the GUI includes a list of entries that each correspond with a potential printer capability, and the control further includes a text field bordering the list,
responsive to detecting new text entered into the text field, the GUI displays an add button overlapping the text field for adding a new entry to the list; and
in response to detecting that a user has clicked on the add button:
if the new text does not duplicate any existing entry in the list:
generating a new entry in the list having a name that matches the new text, and highlighting the new entry in a first color for a period of time; and
if the new text does duplicate an existing entry in the list:
preventing generation of a new entry, and instead presenting a warning, in a second color, bordering the text field;
in response to detecting a cursor over an entry in the list:
displaying a select button for selecting the entry;
in response to determining that the entry is editable, displaying a delete button that deletes the entry from the list; and
in response to determining that the entry is non-editable, preventing display of the delete button; and
in response to detecting that a user has clicked on one of the select buttons to indicate an actual capability of a printer:
highlighting the select button; and
selecting a corresponding entry for the select button in combination with other entries to indicate the actual capabilities of the printer.

9. The method of claim 8 wherein:
highlighting the select button comprises changing a color of the select button.

10. The method of claim 8 wherein:
the list is one of multiple lists stored in the memory, and each list corresponds with a different category of capabilities for printers.

11. The method of claim 10 wherein:
the list corresponds with a category for print media, and selected entries from the list indicate types of print media loaded at the printer.

12. The method of claim 8 wherein:
the selected entries from the list vary depending on printer.

13. The method of claim 8 wherein:
new entries are highlighted in a first color;
the warning is presented in a second color; and
select buttons are highlighted in a third color.

14. The method of claim 8 wherein:
the delete button includes a "−" symbol;
the add button includes a "+" symbol; and
the select button includes a check symbol.

15. A non-transitory computer readable medium embodying programmed instructions which, when executed by a processor, are operable for performing a method comprising:
presenting a Graphical User Interface (GUI) at a display based on instructions stored in a memory, wherein a control of the GUI includes an editable list of entries that each correspond with a potential printer capability, and the control further includes a text field bordering the list,
responsive to detecting new text entered into the text field, the GUI displays an add button at the text field for adding a new entry to the list; and
in response to detecting that a user has clicked on the add button:
if the new text does not duplicate any existing entry in the list:
generating a new entry in the list having a name that matches the new text, and highlighting the new entry in a first color for a period of time; and
if the new text does duplicate an existing entry in the list:
preventing generation of a new entry, and instead presenting a warning, in a second color, bordering the text field;
in response to detecting a cursor over an entry in the list:
displaying a select button for selecting the entry;
in response to determining that the entry is editable, displaying a delete button that deletes the entry from the list; and
in response to determining that the entry is non-editable, preventing display of the delete button; and
in response to detecting that a user has clicked on one of the select buttons:
highlighting the select button; and
selecting a corresponding entry for the select button in combination with other entries to indicate the actual capabilities of the printer.

16. The medium of claim 15 wherein:
highlighting the select button comprises changing a color of the select button.

17. The medium of claim 15 wherein:
the list is one of multiple lists stored in the memory, and each list corresponds with a different category of capabilities for printers.

18. The method of claim 17 wherein:
the list corresponds with a category for print media, and selected entries from the list indicate types of print media loaded at the printer.

19. The medium of claim 15 wherein:
the selected entries from the list vary depending on printer.

20. The medium of claim 15 wherein:
new entries are highlighted in a first color;
the warning is presented in a second color; and
select buttons are highlighted in a third color.

\* \* \* \* \*